United States Patent

Koslosky, Jr.

[15] 3,666,684

[45] May 30, 1972

[54] METAL FERRITE CATALYST ACTIVATION WITH A LARGE AMOUNT OF HALOGEN

[72] Inventor: Frank Koslosky, Jr., Pasadena, Tex.

[73] Assignee: Petro-Tex Chemical Corporation, Houston, Tex.

[22] Filed: June 1, 1970

[21] Appl. No.: 42,553

[52] U.S. Cl. .............................. 252/415, 252/470, 252/471, 252/472, 252/473, 260/680 E
[51] Int. Cl. ..................... B01j 11/22, B01j 11/64, C07c 5/18
[58] Field of Search ............... 252/415, 411, 441, 470–474; 260/680 D, 680 E

[56] References Cited

UNITED STATES PATENTS

| | | | |
|---|---|---|---|
| 3,567,793 | 3/1971 | Colling et al. | 252/471 |
| 3,303,237 | 2/1967 | Croce et al. | 260/680 E |
| 3,450,788 | 6/1969 | Kehl | 260/683 R |
| 3,526,675 | 10/1970 | Croce et al. | 260/680 E |

Primary Examiner—Patrick P. Garvin
Assistant Examiner—P. E. Konopka
Attorney—G. Baxter Dunaway

[57] ABSTRACT

A partially deactivated metal ferrite oxidative dehydrogenation catalyst can be reactivated by contacting the catalyst with a relatively large amount of halogen. For example the yield from a Mg ferrite used in the oxidative dehydrogenation of n-butenes to butadiene had declined from 55.1 to 52.4 percent after 1,350 hours on stream. The catalyst was treated with up to 6,800 ppm of chlorine and after termination of the halogen and removal of residual halogen the yield was 55.9 percent. It was not necessary to remove the catalyst for activation or to stop the oxidative dehydrogenation.

8 Claims, No Drawings

METAL FERRITE CATALYST ACTIVATION WITH A LARGE AMOUNT OF HALOGEN

The present invention relates to the oxidative dehydrogenation of organic compounds in vapor phase over metal ferrite catalysts, more particularly the invention relates to a method of activating the metal ferrite catalysts by contacting the catalysts with a halogen.

Oxidative dehydrogenations employing ferrite catalysts are well known. U.S. Pat. Nos. 3,270,080; 3,284,536; 3,303,234; 3,303,235; 3,303,236; 3,303,238; 3,308,182; 3,324,195; 3,334,152; 3,342,890, 3,398,100; 3,450,787; 3,420,911; 3,420,912; 3,428,703 and 3,440,299 disclose such processes.

Small quantities of halogens have been added in prior art processes for the reaction of organic compounds in vapor phase at elevated temperature, e.g. to promote cracking (U.S. Pat. No. 2,714,085) to promote oxidation (U.S. Pat. No. 2,480,971) to promote hydrogenation (U.S. Pat. No. 1,898,966) and the like.

Recently it has been known to oxidatively dehydrogenate organic compounds by contacting the organic compounds at elevated temperature with oxygen and halogen in the presence of metal ferrite catalysts as shown in U.S. Pat. Nos. 3,270,080; 3,303,234; 3,303,235; 3,303,236; 3,303,238; 3,308,182; 3,308,200; 3,334,152 and 3,342,890.

The metal ferrite catalysts have generally been found to be excellent oxidative dehydrogenation catalysts, however, as with most catalysts, they tend to decline in catalytic activity throughout their use, a characteristic often referred to as "time trend." Ultimately the catalytic activity declines to a point where the catalyst can no longer be economically used. At present the catalyst is removed and disposed of. The catalyst represents one of the key cost factors in oxidative dehydrogenations and furthermore disposal of spent catalyst presents an ever increasing problem and cost in itself. Thus, if there were a way to reactivate the metal ferrite catalyst, preferably without removing them from the reactor, there would be a substantial economic benefit.

It is an object of the present invention to provide a method of activating metal ferrite catalyst for use in oxidative dehydrogenations. It is a further object to provide a method of reactivating a spent metal ferrite catalyst for use in oxidative dehydrogenations. Another object is to provide increased yields of the desired products of oxidative dehydrogenation by activating the metal ferrite catalyst. Another object is to prolong the useful life of the metal ferrite oxidative dehydrogenation catalysts.

These and other objects will become apparent from the following description.

Briefly stated, the present invention is a method of activating a metal ferrite oxidative dehydrogenation catalyst comprising contacting said metal ferrite with a gas comprising a halogen selected from the group consisting of chlorine, bromine, iodine and mixtures thereof or a mixture of said halogen with a gas selected from the group consisting of a reducing gas, inert gas and mixtures thereof, provided that said mixture contains at least 2,000 ppm of said halogen.

Improved catalytic activity can be obtained by contacting a reduced or unreduced metal ferrite with only a halogen selected from the group consisting of chlorine, bromine, iodine and mixtures thereof or in a mixture with an inert gas. A suitable inert gas is nitrogen or helium, for example. The quantity of halogen present will be from at least 2,000 ppm up to 100 mole percent based on total gases present. Small quantities of reducing or oxidizing may be present, i.e., up to 10 mole percent of the total gases.

In one embodiment a fresh metal ferrite is activated prior to use in the presence of a reducing gas which will generally be present in a substantial quantity. The halogen will be present at 2,000 ppm up to about 5 weight percent based on the reducing gas. In a further aspect of this embodiment the reducing gas is an organic compound which is undergoing oxidatively dehydrogenation. The duration of the contacting will vary generally between 10 and 72 hours depending on conditions, catalyst, concentration of reactants, etc., however, longer periods can be employed, for example 7 days or more.

One aspect of the present invention is a method of increasing the catalytic activity of a metal ferrite oxidative dehydrogenation catalyst comprising (a) contacting in vapor phase in the presence of a reducing gas at least 2,000 ppm based on said reducing gas of a halogen selected from the group consisting of chlorine, bromine, iodine and mixtures thereof, with said metal ferrite oxidative dehydrogenation catalyst, and (b) reducing the amount of said halogen contacting said metal ferrite oxidative dehydrogenation catalyst to less than 2,000 ppm based on said reducing gas.

When the metal ferrite catalyst to be activated or reactivated (the process and effect are the same in either event) is a reduced catalyst, the reduction is usually achieved by contacting the ferrite with a reducing gas, for example, hydrogen, CO or a hydrocarbon that is capable of oxidation under the conditions of the contacting. In one embodiment of the present invention the reduction is achieved by the process of oxidative dehydrogenation in which the catalyst is employed. Generally the reduction is obtained at a temperature of at least 250° C. with the temperature of reduction being no greater than 900° C. Where the reduction is carried out independent of the oxidative dehydrogenation the temperature is usually no greater than 850° C.

A further embodiment relates to the activation of a metal ferrite oxidation catalyst that has been in continuous use for several months and whose activity is beginning to decline. The oxidative dehydrogenation can be terminated and the catalyst activated by treating in halogen alone, halogen in an inert gas or halogen in a reducing gas. The reactivation can take place in the reactor or the catalyst can be conveniently removed to other equipment for the particular purpose of halogen activation. The present process, however, can be carried out advantageously without interruption of the oxidative dehydrogenation process by adding at least 2,000 ppm of the halogen up to about 5 weight percent based on the organic compound to be dehydrogenated for a relatively short duration, e.g. about 10 hours to 72 hours. During the halogen addition the selectivity of the reaction may drop and thus produce a reduction in yield. This is a temporary phenomenon and the selectivity and yield will rise after the halogen addition has ceased and remain at a higher level than prior to the halogen activation.

The halogen present in the dehydrogenation zone may be either elemental halogen or any compound of halogen which would liberate halogen under the conditions of reaction. Suitable sources of halogen are such as hydrogen iodide, hydrogen bromide and hydrogen chloride; aliphatic halides, such as ethyl iodide, methyl bromide, methyl chloride, 1,2-dibromo ethane, cycloaliphatic halides, ammonium iodide, ammonium bromide; ammonium chloride, sulfuryl chloride; metal halides including molten halides; and the like. The halogen may be liberated partially or entirely by a solid source as disclosed in the process of U.S. Pat. No. 3,130,241 issued Apr. 21, 1964. Mixtures of various sources of halogen may be used. The amounts of halogen given herein are calculated as elemental halogen.

It has been known prior to this time that the addition of critical amounts of halogen can give increased catalyst activity. However, the increase in catalytic activity was related to a continuing halogen presence. The use of halogen continually in an oxidative dehydrogenation may be undesirable because of the damage that the halogen may cause when it contacts metal and other material in the reactor and recovery equipment, particularly in the presence of water. The relatively infrequent use of halogen for short periods of time that the present process requires does not subject the equipment to acid attack to the degree that continuous treatment does and for that reason is an acceptable expedient for improving catalyst activity.

The present activation can also be used in processes employing a continuous halogen presence to obtain improved metal ferrite catalyst activity. In such an embodiment the addition of halogen to provide for 2,000 ppm to 5 weight percent of halogen based on organic compound to be dehydrogenated may also result in a temporary decline in yield from the reaction, however, after reduction in the halogen in to below 2,000 ppm based on organic compound to be dehydrogenated or to the original halogen level improved results will be obtained because of catalyst activation.

The metal ferrite catalysts contain iron, oxygen and at least one other metallic element Me. The catalysts comprise crystalline compositions or iron, oxygen, and at least one other metallic element Me. The catalysts comprise ferrites. Ordinarily, the ionic radius of the second metallic ingredient(s) Me is small enough that the oxygen anions are not spread too far apart. That is, the elements must be able to form a crystalline structure with the iron and oxygen.

A preferred type of catalyst of this type is that having a face-centered cubic form of crystalline structure. Examples of this type of catalyst are ferrites of the general formula $MeO \cdot Fe_2O_3$ where Me is a divalent metal cation such as $Mg^{++}$ or $Ni^{++}$. However, if the cations are large, such as $Sr^{++}$ (1.35A.), the spinel structure may not occur and other types of ferrites having a hexagonal crystal of the type $SrO \cdot 6Fe_2O_3$ may be formed. These hexagonal ferrites are within the scope of the definition of catalysts of this invention.

Suitable catalysts may also be ferrites wherein other metals are partially substituted for the iron. For example, atoms having a valence of +3 may be partially substituted for some of the $Fe^{+++}$ atoms. Also, metal atoms having a valence of +4 may replace some of the $Fe^{+++}$ ions. However, the catalysts will still suitably have iron present in an amount described above in relation to the total atoms of the second metallic ingredient(s).

The catalyst may have the iron combined in crystalline structure with oxygen and more than one other metallic element, as mentioned above. For example, a preferred type of ferrite is that essentially or approximately of the formula, $MeFe_2O_4$, where Me represents a divalent metal ion with an ionic radius approximately between 0.5 and 1.1A., preferably between about 0.6 and 1.0A. In the case of simple ferrites, Me may be, e.g., one of the divalent ions of the transition elements as Mg, Ca, Sr. Ba, Cr, Mn, Co, Ni, Zn, or Cd; however, a combination of these ions is also possible to form a ferrite such as $Ni_{0.5}Mg_{.5}Fe_2O_4$ or $Ni_{0.25}Mg_{0.75}Fe_2O_4$. Moreover, the symbol Me may represent a combination of ions which have an average valency of two. However, it is essential that the crystalline structure contain iron and the metallic element other than iron.

Examples of catalysts are such as ferrites containing iron combined with at least one element selected from the group consisting of Mg, Zn, Ni, Co, Mn, Cu, Cd, Ca, Ba, Sr, Al, Cr, Ti, V, Mo, W, Na, Li, K, Sn, Pb, Sb, Bi, Ga, Ce, La, Th, other rare earth elements and mixtures thereof, with a preferred group being Mg, Ca, Sr, Ba, Mn, Cr, Co, Ni, Zn, Cd, and mixtures thereof, and particularly preferred metals being Mg or Mn, such as magnesium ferrite, cobalt ferrite, nickel ferrite, zinc ferrite, barium ferrite, strontium ferrite, manganese ferrite, calcium ferrite cadmium ferrite, silver ferrite, zirconium ferrite, and rare earth ferrites such as cerium ferrite or mixtures of ferrites. Examples of mixed ferrites are magnesium ferrite plus zinc ferrite, magnesium ferrite plus nickel ferrite, magnesium ferrite plus cobalt ferrite, magnesium ferrite plus nickel ferrite plus zinc ferrite and magnesium ferrite plus manganese ferrite. As explained above, these ferrites may be physical mixtures of the ferrites or may contain crystals wherein the different metallic atoms are contained in the same crystal, or a combination of physical mixtures and chemical combinations. Some examples of a chemical combination would be magnesium zinc ferrite, magnesium chromium ferrite, zinc chromium ferrite and lanthanum chromium ferrite.

The valency of the metals in the catalysts do not have to be any particular values, although certain combinations are preferred as disclosed elsewhere. The determination of the valency of the ions is sometimes difficult and the results are uncertain. The different ions may exist in more than one valency state. However, a preferred catalyst is one which has the iron predominately in the $Fe^{+++}$ state. Some ferrites are described in Ferromagnetism, by Richard M. Bozorth (D. Van Nostrand Co., Inc., 1951), which disclosure is hereby incorporated by reference.

Although the catalysts may be broadly defined as containing crystalline structures of iron, oxygen and the second metallic ingredient(s), certain types of catalysts are preferred. Valuable catalysts were produced comprising as the main active constituent in the catalyst surface exposed to the reaction gases, iron, oxygen and at least one element selected from the group of Mn, or Periodic Table Groups IIA, IIB or VIII such as those selected from the group consisting of magnesium, manganese, calcium, cadmium, cobalt, zinc, nickel, barium, strontium, and mixtures thereof. The Periodic Table referred to is the one on pages 400–401 of the Handbook of Chemistry and Physics (39th edition, 1957–58, Chemical Rubber Publishing Co., Cleveland, Ohio.) Preferred catalysts have iron present as the predominant metal in the catalyst exposed in the reaction gases.

In one class of catalysts containing two second metallic ingredients are those of the basic formula $Me_aCr_bFe_cO_4$ where $a$ can vary within the range of about 0.1 to about 3, $b$ can vary from greater than 0 to less than 2 and $c$ can vary from greater than 0 to less than 3. Me can be any of the metallic ingredients, other than chromium, previously described, particularly Periodic Table Groups IIA, IIB, III and VIII. In particularly, the metals from these groups that are desirable are Mg, Ba, La, Ni, Zn, and Cd.

The preferred compositions exhibit a certain type of X-ray diffraction pattern. The preferred compositions do not have any sharp X-ray diffraction reflection peaks as would be found, e.g., in a highly crystalline material having the same chemical composition. Instead, the preferred compositions of this invention exhibit reflection peaks which are relatively broad. The degree of sharpness of the reflection peak may be measured by the reflection peak bank width at half height (W h/2). In other words, the width of the reflection peak as measured at one-half of the distance to the top of the peak is the "-band width at half height." The band width at half height is measured in units of ° theta. Techniques for measuring the band widths are discussed, e.g., in Chapter 9 of Klug and Alexander, X-ray Diffraction Procedures, John Wiley and Son, N.Y., 1954. The observed band widths at half height of the preferred compositions of this invention are at least 0.16 °2 theta and normally will be at least 0.20 °2 theta.*(*The powder diffraction patterns may be made, e.g., with a Norelco constant potential diffraction unit type No. 12215/0 equipped with a wide range goniometer type No. 42273/0 cobalt tube type No. 32119, proportional counter type No. 57250/1; all coupled to the Norelco circuit panel type No. 12206/53. The cobalt K alpha radiation is supplied by operating the tube at a constant potential of 30 kilovolts and a current of 10 milliamperes. An iron filter is used to remove K beta radiation. The detector voltage is 1,160 volts and the pulse height analyzer is set to accept pulses with amplitudes between 10 and 30 volts only. Slits used are divergence 1°, receiving 0.006 inch and scatter 1°. Strip chart recordings for identification are made with a scanning speed of one-fourth ° per minute, time constant of 4 seconds and a full scale of $10^3$ counts per second. No correction is made of K $\alpha$ doublet or instrumental broadening of the band widths.) For instance, excellent compositions have been made with band widths at half height of at least 0.22 or 0.23 °2 theta. The particular reflection peak used to measure the band width at one half height is the reflection peak having Miller (hkl) indices of 220. (See, e.g. Chapter of Klug and Alexander, ibid). Applicants do not wish to be limited to any theory of the invention in regard to the relationship between composition activity and band width.

Suitable preferred ferrites according to this invention are zinc ferrites having X-ray diffraction peaks within the d-spacings 4.83 to 4.89, 2.95 to 3.01, 2.51 to 2.57, 2.40 to 2.46, 2.08 to 2.14, 1.69 to 1.75, 1.59 to 1.65 and 1.46 to 1.52 with the most intensive peak being between 2.51 to 2.57 manganese ferrite having peaks at d-spacings within or about 4.87 to 4.93, 2.97 to 3.03, 2.50 to 2.58, 2.09 to 2.15, 1.70 to 1.76, 1.61 to 1.67 and 1.47 to 1.53, (with other peaks) with the most intense peak being between 2.52 to 2.58; magnesium ferrites having peaks between 4.80 to 4.86, 2.93 to 2.99, 2.49 to 2.55, 2.06 to 2.12, 1.68 to 1.73, 1.58 to 1.63 and 1.45 to 1.50 with the most intense peak being between 2.49 and 2.55; and nickel ferrites having peaks within the d-spacings of 4.79 to 4.85, 2.92 to 2.98, 2.48 to 2.54, 2.05 to 2.11, 1.57 to 1.63 and 1.44 to 1.49, with the most intense peak being within 2.48 to 2.54. The preferred manganese ferrites are those having the Mn predominately present as a valence of plus 2.

Ferrite formation may be accomplished by reacting an active compound of iron with an active compound of the designated metals. By active compound is meant a compound which is reactive under the conditions to form the ferrite. Starting compounds of iron or the other metal may be such as the nitrates, hydroxides, hydrates, oxalates, carbonates, acetates, formates, halides, oxides, etc. The starting compounds are suitably oxides or compounds which will decompose to oxides during the formation of the ferrite such as organic and inorganic salts or hydroxides. For example, manganese carbonate may be reacted with iron oxide hydrates to form manganese ferrite. Salts of the desired metals may be coprecipitated and the precipitate heated to form the ferrite. Desired ferrites may be obtained by conducting the reaction to form the ferrite at relatively low temperatures, that is, at temperatures lower than some of the very high temperatures used for the formation of some of the semiconductor applications. Good results, e.g., have been obtained by heating the ingredients to a temperature high enough to produce the required ferrite but at conditions no more severe than equivalent to heating at 950° C or 1,000° C for 90 minutes in air and generally the maximum temperature will be less than 1,300° C and preferably less than 1,150° C. Methods for preparing catalysts suitable for this invention are disclosed in U.S. Pat. Nos. 3,270,080; 3,248,536; 3,303,234–6; 3,303,238; 3,308,182; 3,334,152; 3,342,890 and 3,450,787 and these disclosures are hereby incorporated by reference.

The catalysts may contain an excess of iron over the stoichiometric amount to form the ferrite. For example, in a ferrite of the type MeFe$_2$O$_4$ the stoichiometric amount of iron would be 2 atoms per atom of Me. The iron (calculated as Fe$_2$O$_3$) may be present in an amount of at least about 10 percent in excess of the stoichiometric amount and preferably may be present in an amount of at least 14 percent in excess. Suitable ranges of iron are from about 10 to 200 percent excess. Similarly the catalysts may contain an excess of Me over the stoichiometric amount. A suitable range of Me content would be from about 0.05 to 2 atoms of Me per atom of iron.

The compositions of this invention may also comprise additives, such as disclosed in U.S. Pat. No. 3,270,080 and U.S. Pat. No. 3,303,238. Phosphorus, silicon, boron, sulfur or mixtures thereof are examples of additives. Excellent catalysts may contain less than 5 weight percent, and preferably less than 2 weight percent, of sodium or potassium in the surface of the catalyst. Solid sulfur containing compounds such as manganese sulfate can be incorporated along with manganese carbonate to form a sulfur containing manganese ferrite. Another method is to mix a ferrite, e.g. nickel ferrite with a solution of sulfuric acid. The resulting slurry can then be dried and pelleted or coated on a carrier and then dried.

Carriers or supports for the catalyst may be employed such as alumina pumice, silica and so forth. Diluents and binders may also be used. Unless stated otherwise, the compositions referred to in this application are the main active constituents of the dehydrogenation process during dehydrogenation and any ratios and percentages refer to the surface of the catalyst in contact with the gaseous phase during dehydrogenation.

The process of this invention may be applied to the dehydrogenation of a wide variety of organic compounds. Such compounds normally will contain from two to 20 carbon atoms, at least one

grouping, a boiling point below about 350° C, and such compounds may contain other elements, in addition to carbon and hydrogen such as oxygen, halogens, nitrogen and sulfur. Preferred are compounds having two to 12 carbon atoms, and especially preferred are compounds of three to six or eight carbon atoms.

Among the types of organic compounds which may be dehydrogenated by means of the process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. Illustration of dehydrogenations include propionitrile to acrylonitrile; propionaldehyde to acrolein; ethyl chloride to vinyl chloride; methyl isobutyrate to methyl methacrylate; 2 or 3-chlorobutene-1 or 2, 3-dichlorobutane to chloroprene; ethyl pyridine to vinyl pyridine; ethylbenzene to styrene; isopropylbenzene to α-methyl styrene; ethylcyclohexane to styrene; cyclohexane to benzene; ethane to ethylene or acetylene; propane to propylene methyl acetylene, allene, or benzene; isobutane to isobutylene; n-butane to butene and butadiene-1,3; n-butene to butadiene-1,3, and vinyl acetylene; methyl butene to isoprene; cyclopentane to cyclopentene and cyclopentadiene-1,3; n-octane to ethyl benzene and orthoxylene; monomethylheptanes to xylenes; ethyl acetate to vinyl acetate; 2,4,4-trimethylpentane to xylenes; and the like. This invention may be useful for the formation of new carbon to carbon bonds by the removal of hydrogen atoms such as the formation of a carbocyclic compound from two aliphatic hydrocarbon compounds or the formation of a dicyclic compound from a monocyclic compound having an acyclic group such as the conversion of propene to diallyl. Representative materials which are dehydrogenated by the novel process of this invention include ethyl toluene, alkyl chlorpbenzenes, ethyl napthalene, isobutyronitrile, propyl chloride, isobutyl chloride, ethyl fluoride, ethyl bromide, n-pentyl iodide, ethyl dichloride, 1,3, -dichloropbutane, 1,4-dichlorobutane, the chlorofluoroethanes, methyl pentane, methylethyl ketone, diethyl ketone, n-butyl alcohol, methyl propionate and the like.

Suitable dehydrogenation reactions are the following: Acyclic compounds having four to five non-quarternary contiguous carbon atoms to the corresponding olefins, diolefins or acetylenes having the same number of carbon atoms; aliphatic hydrocarbons having six to 16 carbon atoms and at least one quarternary carbon atom to aromatic compounds, such as 2,4,4-trimethylpentene-1 to a mixture of xylenes; acyclic compounds having six to 16 carbon atoms and no quarternary carbon atoms to aromatic compounds such as n-hexenes to benzene; cycloparaffins and cycloolefins having five to eight carbon atoms to the corresponding olefin, diolefin or aromatic compound, e.g., cyclohexane to cyclohexene or cyclohexadiene or benzene; aromatic compounds having eight to 12 carbon atoms including one or two alkyl side chains of two to three carbon atoms to the corresponding aromatic with unsaturated side chains such as ethyl benzene to styrene.

The preferred compounds to be dehydrogenated are hydrocarbons with a particular preferred class being acyclic non-quarternary hydrocarbons having four to five contiguous carbon atoms or ethyl benzene and the preferred products are n-butene-1 or 2, butadiene-1,3, vinyl acetylene, 2-methyl-1-butene, 3-methyl-1-butene, 2-methyl-2-butene, isoprene, styrene or mixtures thereof. Especially preferred as feed are n-butene-1 or 2 and the methyl butenes and mixtures thereof such as hydrocarbon mixtures containing these compounds in at least 50 mole percent.

The dehydrogenation reaction may be carried out at atmospheric pressure, superatmospheric pressure or at sub-atmospheric pressure. The total pressure of the system will normally be about or in excess of atmospheric pressure, although sub-atmospheric pressure may also desirably be used.

Generally, the total pressure will be between about 4 p.s.i.a. and about 100 or 125 p.s.i.a. Preferably, the total pressure will be less than about 75 p.s.i.a. and excellent results are obtained at about atmospheric pressure.

The organic compound to be dehydrogenated is contacted with oxygen in order for the oxygen to oxidatively dehydrogenate the compound. Oxygen may be fed to the reactor as pure oxygen, as air, as oxygen-enriched air, oxygen mixed with diluents, solid oxidants, and so forth. Oxygen may also be added in increments to the dehydrogenation zone. Although determinations regarding the mechanism of reaction are difficult, the process of this invention is an oxidative dehydrogenation process wherein the predominant mechanism of this invention is by the reaction of oxygen with the hydrogen released from the hydrocarbon.

The amount of oxygen employed may vary depending upon the desired result such as conversion, selectivity and the number of hydrogen atoms being removed. Thus, to dehydrogenate butane to butene requires less oxygen than if the reaction proceeds to produce butadiene. Normally oxygen will be supplied (including all sources, e.g. air to the reactor) in the dehydrogenation zone in an amount from about 0.2 to 1.5, preferably 0.3 to 1.2 moles per mole of $H_2$ being liberated from the organic compound. Ordinarily the moles of oxygen supplied will be in the range of from 0.2 to 2.0 moles per mole of organic compound to be dehydrogenated and for most dehydrogenations this will be within the range of 0.25 to 1.5 moles of oxygen per mole of organic compound.

Preferably, the reaction mixture contains a quantity of steam or diluent such as nitrogen with the range generally being between about 2 and 40 moles of steam per mole of organic compound to be dehydrogenated. Preferably, steam will be present in an amount from about 3 to 35 moles per mole of organic compound to be dehydrogenated and excellent results have been obtained within the range of about 5 to about 30 moles of steam per mole or organic compound to be dehydrogenated. The functions of the steam are several-fold, and the steam may not merely act as a diluent. Diluents generally may be used in the same quantities as specified for the steam. These gases serve also to reduce the partial pressure of the organic compound.

The temperature for the dehydrogenation reaction generally will be at least about 250° C., such as greater than about 300° or 375° C., and the maximum temperature in the reactor may be about 700° or 800° C., or perhaps higher such as 900° C. under certain circumstances. However, excellent results are obtained within the range of or about 350° to 700° C. such as from or about 400° C. to or about 675° C. The temperatures are measured at the maximum temperature in the dehydrogenation zone.

The gaseous reactants may be conducted through the reaction chamber at a fairly wide range of flow rates. The optimum flow rate will be dependent upon such variables as the temperature of reaction, pressure, particle size, and so forth. Desirable flow rates may be established by one skilled in the art. Generally the flow rates will be within the range of about 0.10 to 10 liquid volumes of the organic compound to be dehydrogenated per volume of dehydrogenation zone containing catalyst per hour (referred to as LHSV). Usually, the LHSV will be between 0.15 and about 5. For calculations, the volume of a fixed bed dehydrogenation zone containing catalyst is that original void volume of reactor space containing catalyst.

The process of this invention utilizes either a fixed bed or moving bed, such as a fluidized catalyst reactor. Reactors which have been used for the dehydrogenation of hydrocarbons by non-oxidative dehydrogenation are satisfactory such as the reactors for the dehydrogenation of n-butene to butadiene-1,3. Although means to remove heat from the reactor may be employed, such as coils, the invention is particularly useful with essentially adiabatic reactors where heat removal is a problem.

A further advantage of the present process is that the activating halogen may be present in addition to process halogen. Generally process halogen will be present in an amount far less than the 2,000 ppm based on the weight of organic compound being dehydrogenated required in the present invention. Preferred ranges of process halogen are less than 1,000 ppm with ranges up to 700 or 800 ppm being particularly suitable. Very small quantities are utilized to achieve improvement such as about 10 ppm. Optimum ranges are about 20 to 800 ppm and 75 to 700 ppm. The halogen can be added continuously, however, it is not essential and increments of process halogen can be added so that the level of halogen remains within the stated ranges. The sources of halogen are the same as previously given.

The following examples will further illustrate the invention. All percentages are weight percent unless otherwise indicated. All conversions, selectivities and yields are expressed in mole percent of the designated feed.

EXAMPLES 1–14

These examples demonstrate several of the various embodiments described above. The process was the oxidative dehydrogenation of n-butenes (90 percent n-butene-2 and n-butene-1, the remainder being n-butane, isobutane and butadiene) to butadiene. The LHSV was 1.5, the mole ratio of steam to hydrocarbon was 15 and the mole ratio of oxygen to hydrocarbon was 0.55. The reactor employed a 30 inch bed of catalyst with thermodectors located at spaced intervals through the length of the bed. The temperature profile of the reaction in the bed was maintained by adjusting the inlet temperature of the incoming gases as required which varied from 744°–807° F. The catalyst was a magnesium ferrite having a weight ratio of $Fe_2O_3$ to MgO of about 4.4 to 1 prepared by slurrying $Fe_2O_3 \cdot H_2O$, $MgCO_3$ and 2 weight percent $MgCl \cdot 6H_2O$. The slurry was extruded, dried, milled, mixed with a 3 percent solution of 85 percent phosphoric acid, discharged into a suitable mill, formed into ⅛ inch pellets, dried and calcined in air for 1 hour at 1,590° F. Chlorine was added to the reactor ahead of the catalyst as anhydrous HCl. Other conditions and the results are shown in the Table.

TABLE

| Example | Conditions | | | | Results, mole percent | | |
|---|---|---|---|---|---|---|---|
| | Hours on stream | Cl, p.p.m. | Inlet temp., °F. | Max temp., °F. | Conversion | Selectivity | Yield |
| 1 | 708 | ---- | 745 | 1,118 | 60.4 | 91.3 | 55.1 |
| 2 | 1,349 | ---- | 745 | 1,122 | 57.8 | 90.7 | 52.4 |
| 3 | 1,400 | 700 | 755 | 1,115 | 65.8 | 92.4 | 60.8 |
| 4 | 1,600 | 700 | 755 | 1,108 | 65.1 | 93.0 | 60.5 |
| 5 | 1,900 | 200 | 755 | 1,115 | 66.1 | 92.0 | 60.8 |
| 6 | 2,185 | 30 | 755 | 1,115 | 60.7 | 92.2 | 56.0 |
| 7 | 2,465 | 600 | 757 | 1,112 | 63.9 | 92.8 | 59.3 |
| 8 | 2,766 | 2,300 | 772 | 1,135 | 60.7 | 90.9 | 55.2 |
| 9 | 2,898 | 3,500 | 795 | 1,162 | 61.5 | 91.5 | 56.2 |
| 10 | 3,020 | 4,300 | 800 | 1,160 | 60.2 | 92.3 | 55.6 |
| 11* | 3,115 | 4,300 | 802 | 1,125 | 61.4 | 91.8 | 56.4 |
| 12* | 3,195 | 6,800 | 798 | 1,120 | 61.0 | 91.7 | 55.9 |
| 13 | 3,427 | 850 | 753 | 1,105 | 67.5 | 93.3 | 63.0 |
| 14 | 3,953 | ---- | 753 | 1,123 | 61.2 | 91.3 | 55.9 |

*S/HC mole ratio 18/1.

Example 1 shows the high degree of activity in a fresh catalyst after 700 hours on stream. Example 2 shows the decline in catalytic activity of the catalyst after 1,349 hours on stream. Examples 3–7 demonstract the known enhancing effect of small quantities, e.g., 30–700 ppm of a halogen. Examples 8 - 12 demonstrate the deactiving effect of larger quantities than about 2,000 ppm on the dehydrogenation. The suppressing effects of the large amounts of halogen are dispelled when the halogen concentration is reduced as shown in Example 13. Also Example 13 demonstrates the activing effect of high concentration of halogen, (compare the oxidative dehydrogenation in the presence of small amounts of halogen before and after activation, Examples 3–7 and 13 respectively).

Example 14 demonstrates the improvement in the catalyst activity in an oxidative dehydrogenation in the absence of any halogen. Example 14 gave a 6.7 percent higher yield than that obtained from the unactivated catalyst of Example 2 and a slightly better yield than the fresh catalyst of Example 1. Chromatographic analysis of the product stream of Example 14 showed no detectable halogen thus assuring that the result reflected a true activation of the catalyst and not merely the effect of residual halogen.

No significance is attached to the low halogen concentration of Examples 3–7 other than the previously known promoting effect of halogen on the oxidative dehydrogenation. It has been observed many times that the termination of halogen, for example, after Example 6 will result in a continuing decline in the yield as the halogen concentration declines until all of the residual halogen has been removed at which time the catalyst will have returned to substantially the same degree of activity that would have resulted from continued use if the low halogen concentration had never been present, i.e., in this case less than 52.4 percent yield.

The invention claimed is:

1. A method of reactivating a preformed metal ferrite catalyst deactivated in the oxidative dehydrogenation of dehydrogenatable hydrocarbon compounds, wherein the metal portion of said metal ferrite is selected from the group consisting of Mg, Ca, Sr, Ba, Mn, Cr, Co, Ni, Zn, Cd and mixtures thereof comprising;

a. contacting said deactivated preformed metal ferrite oxidative dehydrogenation catalyst with a reactivation gas selected from the group consisting of a hydrocarbon gas, an inert gas and mixtures thereof containing from 2,000 parts per million to about 5 weight percent based on the weight of said gas of a halogen selected from the group consisting of chlorine, bromine, iodine and mixtures thereof at a temperature of about 250° to 900° C. and at an LHSV of about 0.10 to 10 and b. terminating said halogen addition in about 10 hours to 7 days.

2. The method of claim 1 wherein the reactivation gas is a hydrocarbon gas additionally containing 0.2 to 2.0 moles of oxygen per mole of hydrocarbon.

3. The method according to claim 1 wherein the hydrocarbon compound to be dehydrogenated contains two to 20 carbon atoms.

4. The method according to claim 1 wherein the metal is Mg or Mn.

5. The method according to claim 4 wherein the metal is Mg.

6. The method according to claim 5 wherein the halogen is chlorine.

7. The method according to claim 6 wherein the hydrocarbon compound to be dehydrogenated is an acyclic non-quarternary hydrocarbon having four to five contiguous carbon atoms.

8. The method according to claim 7 wherein the hydrocarbon is a normal butene.

* * * * *